United States Patent
Fischer

(10) Patent No.: US 8,810,975 B2
(45) Date of Patent: Aug. 19, 2014

(54) INPUT CAPACITOR PROTECTION CIRCUIT

(75) Inventor: Jonathan H. Fischer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 794 days.

(21) Appl. No.: 12/838,438

(22) Filed: Jul. 17, 2010

(65) Prior Publication Data

US 2012/0014023 A1  Jan. 19, 2012

(51) Int. Cl.
*H02H 7/16* (2006.01)
*H02H 9/04* (2006.01)

(52) U.S. Cl.
CPC ............................... *H02H 9/04* (2013.01)
USPC .......................................................... 361/15

(58) Field of Classification Search
USPC ................................................ 361/15, 16
See application file for complete search history.

(56) References Cited

U.S. PATENT DOCUMENTS

| | | | |
|---|---|---|---|
| 3,512,149 A * | 5/1970 | Pugh ............................ 340/647 |
| 4,319,197 A * | 3/1982 | Trummer ........................ 330/11 |
| 4,498,063 A * | 2/1985 | Makabe et al. ................ 333/173 |
| 5,039,963 A * | 8/1991 | Fischer ......................... 333/173 |
| 5,874,830 A | 2/1999 | Baker |
| 6,046,896 A * | 4/2000 | Saeki et al. ..................... 361/86 |
| 6,540,677 B1 * | 4/2003 | Angelsen et al. ............. 600/437 |
| 6,876,255 B2 | 4/2005 | Reber |
| 7,102,862 B1 * | 9/2006 | Lien et al. ....................... 361/56 |
| 7,656,003 B2 | 2/2010 | Davies |
| 7,672,102 B2 | 3/2010 | Kemper |
| 2003/0050026 A1 * | 3/2003 | Connell et al. ............. 455/183.1 |
| 2004/0108899 A1 * | 6/2004 | May .............................. 330/277 |
| 2004/0263370 A1 * | 12/2004 | Oliaei et al. ................... 341/138 |
| 2005/0269619 A1 * | 12/2005 | Shor et al. ..................... 257/313 |
| 2009/0309556 A1 * | 12/2009 | Franco et al. ................. 323/234 |
| 2010/0045364 A1 | 2/2010 | Law et al. |
| 2011/0264292 A1 * | 10/2011 | Morishima et al. ........... 700/292 |

* cited by examiner

*Primary Examiner* — Rexford Barnie
*Assistant Examiner* — Ann Hoang
(74) *Attorney, Agent, or Firm* — Mendelsohn, Drucker & Dunleavy, P.C.; Steve Mendelsohn

(57) ABSTRACT

A MOS-type semiconductor input capacitor protection circuit and system is described. In one embodiment, the system includes a MOS device configured as an input capacitor and configured to receive an input bias voltage. A bias monitor circuit is configured to monitor the input bias voltage and apply a selective capacitor bias voltage to the input capacitor so as to limit the voltage across the input capacitor to a level below a threshold voltage.

16 Claims, 5 Drawing Sheets

INPUT CAPACITOR PROTECTION CIRCUIT

FIELD OF TECHNOLOGY

Embodiments of the present invention relate to semiconductor devices. More particularly, embodiments of the present invention relate to input capacitor protection circuits.

BACKGROUND

Input capacitors are used in certain applications to AC couple an input or an output to next stage devices. For example, sensors used in a disk drive application may need to be coupled to an input pin of a preamplifier circuit, via an input capacitor as an AC coupling capacitor. As circuit density and bandwidth requirements for many state of the art applications such as preamps for hard disk drives increase, fine line CMOS technology is used. To achieve the power, bandwidth and die size goals, the CMOS device dimensions are scaled down to sub micron dimensions. The operating voltage of these devices range from −3.0 Volts to +3.3 Volts. The voltage ratings of the devices are also scaled down. For example, in a 0.25 um CMOS technology, the devices typically are rated for voltages less than 3.6 Volts across the CMOS devices. Sometimes, this voltage is referred to as voltage stress limit or voltage stress threshold value.

In some embodiments, MOS devices are used as coupling capacitors. The MOS devices require DC bias voltage across them to work properly as capacitors. As the input voltage swings between −3.0 Volts to +3.3 Volts, DC biased MOS device based capacitors may be subjected to voltages beyond the rated voltage range for MOS devices.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

Systems and devices for input capacitor protection circuits are disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
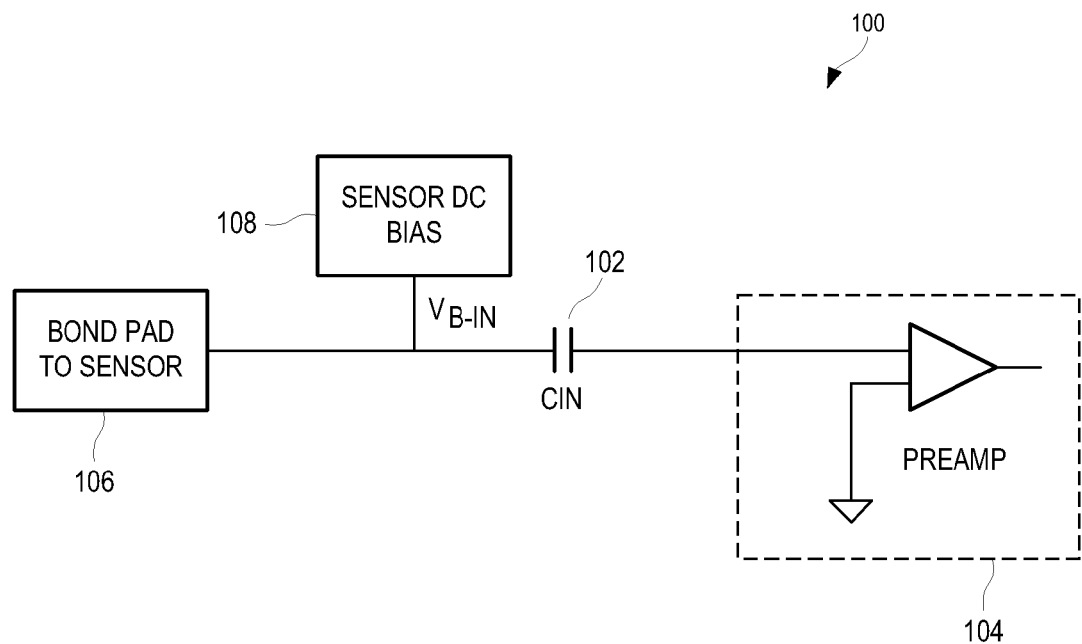
FIG. 1 illustrates an exemplary input capacitor to couple a sensor to a preamplifier.

FIG. 1 illustrates a system 100 with an exemplary input capacitor 102 to couple a sensor (not shown) to a preamplifier 104. In particular, FIG. 1 illustrates a system 100 for use with a sensor, wherein the sensor is coupled to the system 100 using an input pad 106. In one example, the sensor may be of the resistor type used in a disk drive. In some embodiments, the sensor uses a DC bias voltage $V_{B-IN}$. In one embodiment, the sensor DC bias voltage $V_{B-IN}$ is applied to the sensor by a Sensor DC bias voltage circuit 108. In some embodiments, the Sensor DC bias voltage $V_{B-IN}$ may range from −1 Volts to +1 Volts. The Sensor DC bias voltage $V_{B-IN}$ may sometimes be referred to as input bias voltage $V_{B-IN}$. The input capacitor 102 is coupled to the input pad 106 and the sensor bias circuit 108. The input capacitor 102 is also coupled to the preamplifier 104.

In one embodiment, the external environment changes the resistance of the sensor so a small ac signal is generated across the sensor. The input capacitor 102 couples the generated ac signal to the preamplifier 104 while blocking the DC bias voltage $V_{B-IN}$. In some embodiments, the preamplifier 104 operates using a voltage of VEE and VP33. In one example, the voltage VEE may be about −3 Volts and voltage VP33 may be about +3.3 Volts. Based on these operating voltages of VP33 and VEE, various devices in the system may be subjected to a voltage range of between VP33 and VEE. For example, the devices may be subjected to a voltage range of −3 Volts to +3.3 Volts.

In some embodiments, the preamplifier 104 may be built using a sub micron CMOS technology, for example, using a triple well 3.3 Volts sub micron CMOS technology. In some embodiments, the input capacitor 102 may be built from MOS devices connected as capacitors, as thin gate oxide gives higher capacitance per unit area than capacitors built using metal oxide technology. An exemplary characteristics of these MOS inversion capacitors are described with reference to FIG. 2.

Figure 2:
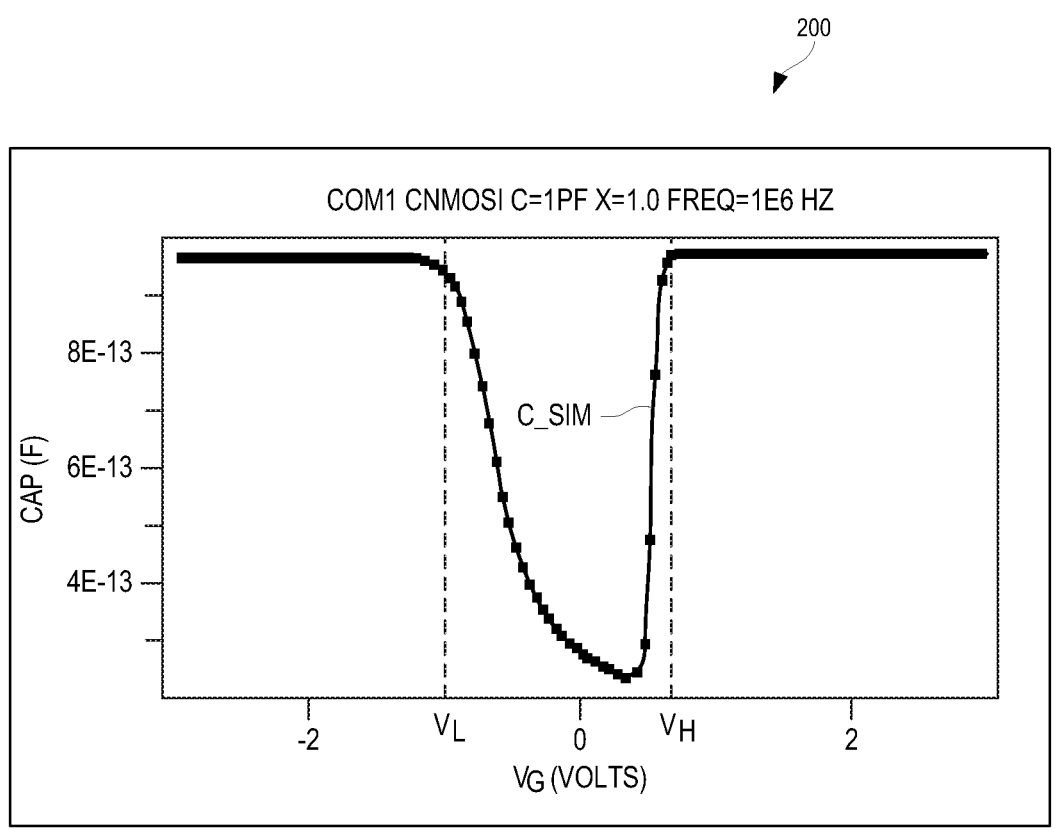
FIG. 2 illustrates an exemplary relationship between capacitance and capacitor bias voltage for a MOS inversion capacitor according to one embodiment.

FIG. 2 illustrates an exemplary relationship graph 200 between capacitance and capacitor bias voltage for a MOS inversion capacitor according to one embodiment. The X-axis shows the capacitor bias voltage (Vg) in volts. The Y-axis shows the capacitance of the MOS inversion capacitor for various capacitor bias voltage Vg. As it is evident from the graph 200, for a capacitor bias voltage below a lower bias voltage $V_L$, the capacitor exhibits a high capacitance value. Similarly, for a capacitor bias voltage above a higher bias voltage $V_H$, the capacitor exhibits a high capacitance value.

Therefore, for better efficiency, it is desirable to set the bias voltage for the capacitor below the lower bias voltage $V_L$ or above the higher bias voltage $V_H$. For a capacitor bias voltage between lower bias voltage $V_L$ and the higher bias voltage $V_H$, the capacitor exhibits a low capacitance value. In the specific example, the lower bias voltage $V_L$ is about −1 Volts and the higher bias voltage $V_H$ is about 0.6 Volts. Now, an exemplary AC coupled amplifier using MOS inversion capacitors is described with reference to FIG. 3.

Figure 3:
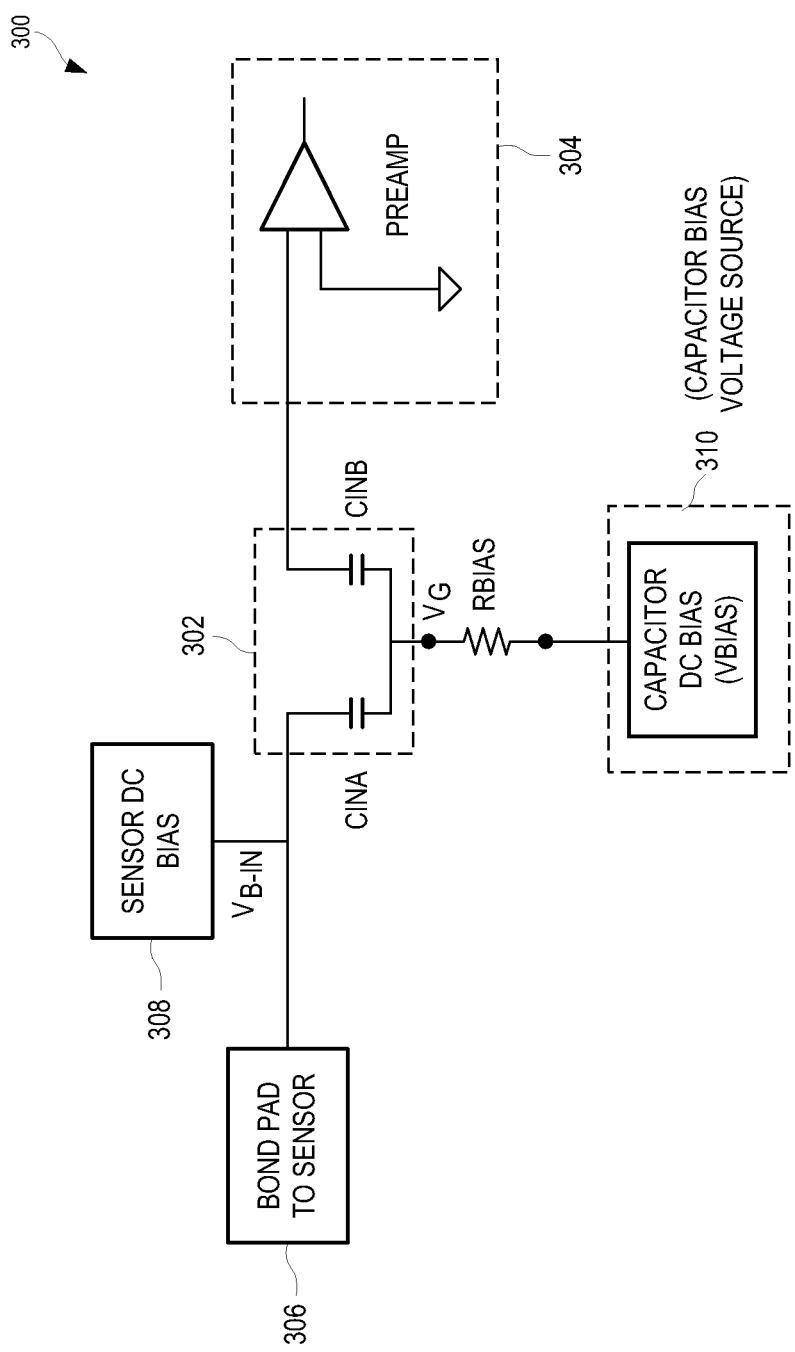
FIG. 3 illustrates an exemplary AC coupled amplifier using MOS inversion capacitors according to one embodiment.

FIG. 3 illustrates an exemplary AC coupled amplifier using MOS inversion capacitors according to one embodiment. More specifically, FIG. 3 describes a system 300 with a MOS inversion capacitor 302 and a preamplifier 304. The system 300 is similar to system 100 described with reference to FIG. 1, but with a MOS inversion capacitor bank 302 and a capacitor bias voltage source 310. The MOS inversion capacitor bank 302 includes a plurality of MOS inversion capacitors CinA and CinB. The MOS inversion capacitors CinA and CinB are connected in series and configured to receive a capacitor bias voltage Vg from the capacitor bias voltage source 310. The MOS inversion capacitors CinA and CinB act as input capacitors for the preamplifier 304, coupling a sensor (not shown) to the preamplifier 304.

In some embodiments, the sensor uses a DC bias voltage $V_{B-IN}$. In one embodiment, the sensor DC bias voltage $V_{B-IN}$ is applied to the sensor by a Sensor DC bias voltage circuit 308. In some embodiments, the Sensor DC bias voltage $V_{B-IN}$ may range from −1 Volt to +1 Volt. The MOS input capacitor bank 302 is coupled to the input pad 306 and the sensor bias circuit 308.

The capacitor bias voltage source 310 may couple the capacitor bias voltage Vg through a bias resistor Rbias. The value of bias resistor Rbias is chosen to be large enough to cause minimal signal attenuation over the sensor ac signal band.

Now, an exemplary operation of system 300 when the sensor DC bias voltage $V_{B-IN}$ may range from −1 Volt to +1 Volt. As previously discussed with reference to FIG. 2, for better efficiency, it is desirable to set the capacitor bias voltage Vg for the capacitor below the lower bias voltage $V_L$ or above the higher bias voltage $V_H$. In the specific example, the lower bias voltage $V_L$ is about −1 Volts and the higher bias voltage $V_H$ is about 0.6 Volts. In one embodiment, the capacitor bias voltage Vg is set to −1.5 Volts when the sensor DC bias voltage is in the range of 0 to +1 Volt and is set to −2.25 Volts when the sensor DC bias voltage is in the range of −1 to 0 Volt, so as to keep both CinA and CinB in their high capacitance range.

Under certain circumstances, for example, during test conditions or fault conditions, the input pad 306 may be subjected to a voltage within the full operating voltage range of between VEE and VP33. In some embodiments, VEE is about −3 Volts and VP33 is about +3.3 Volts. If the input pad 306 is pulled to VEE, for example, −3 Volts, the MOS inversion capacitor CinA is subjected to a voltage of −3−(−2.25)=−0.75 Volts, which is well within the maximum permitted voltage of 3.6 Volts or well within the voltage stress limit (or voltage stress threshold value). However, if the input pad 306 is pulled towards VP33(+3.3 V), when the capacitor bias voltage Vg is about −2.25 Volts, the MOS inversion capacitor CinA will be subjected to the maximum permitted voltage of 3.6 Volts when the input pad 306 is about +1.35 Volts. Similarly, when the capacitor bias voltage Vg is about −1.5 Volts, the MOS inversion capacitor CinA will be subjected to the maximum permitted voltage of 3.6 Volts when the input pad 306 is about +2.1 Volts. When the voltage at the input pad 306 exceeds about +2.1 Volts, the MOS inversion capacitor CinA will be subjected to a voltage beyond the maximum permitted voltage of 3.6 Volts or beyond the voltage stress limit (or voltage stress threshold value).

As one skilled in the art appreciates, it is desirable to minimize overstress conditions for the MOS devices. Now, a system with a bias monitor circuit to minimize overstress conditions for the MOS devices is described with reference to FIG. 3A and FIG. 3B.

Figure 3A:
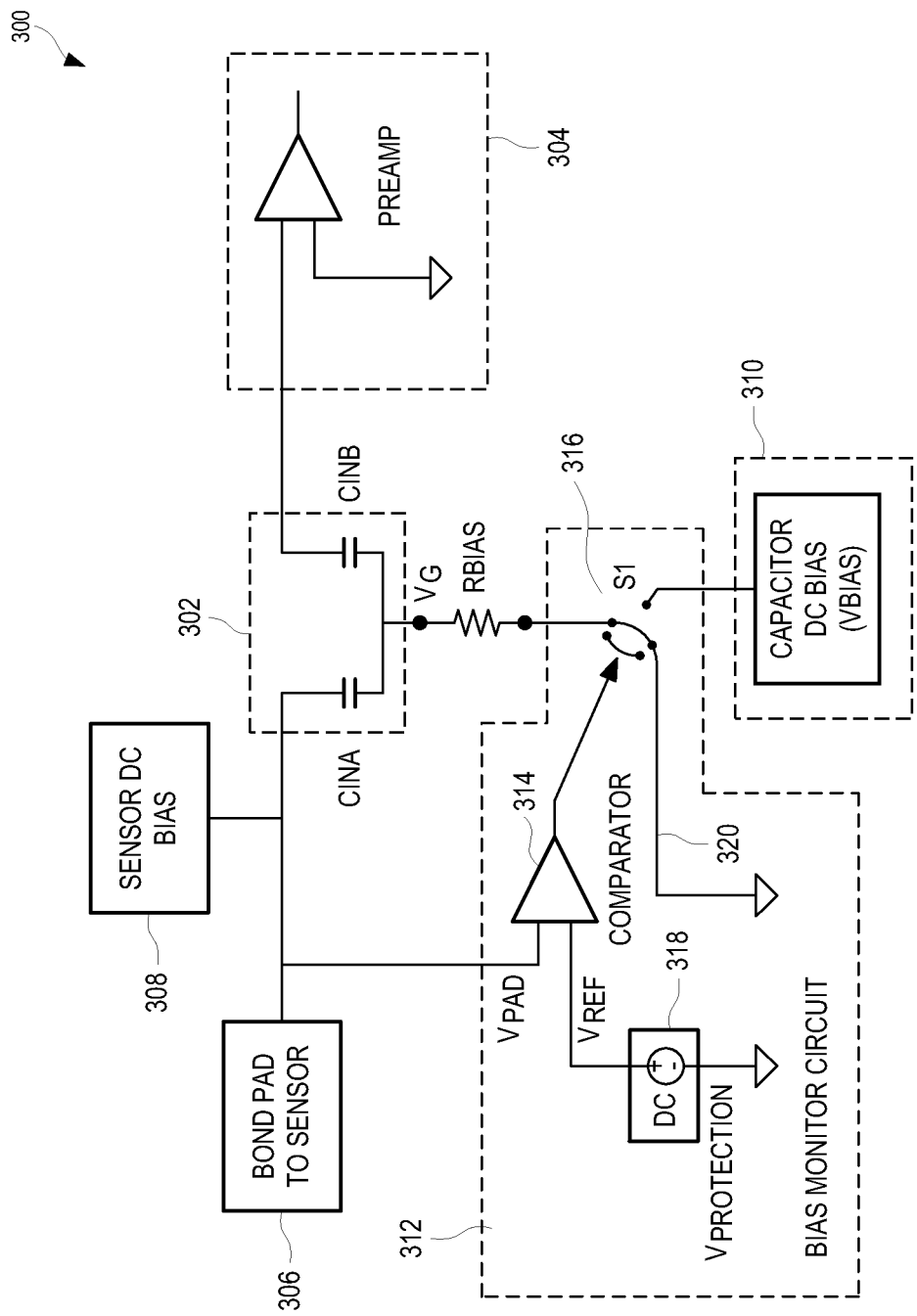
FIG. 3A illustrates exemplary input capacitor protection circuit for the MOS inversion capacitors of FIG. 3 according to one embodiment.

FIG. 3A illustrates exemplary input capacitor protection circuit for the MOS inversion capacitors of FIG. 3 according to one embodiment. More specifically, the system 300 further includes a bias monitoring circuit 312. The bias monitoring circuit 312 further includes a voltage comparator 314 and a switch 316. The switch 316 is configured to toggle between a first position and a second position. In the first position, the switch 316 couples the capacitor bias resistance Rbias to the output of the capacitor bias voltage generator 310. In the second position, the switch 316 couples the capacitor bias resistance Rbias to a second voltage source 320. In this specific embodiment, the second voltage source 320 is a ground potential.

One of the inputs of the comparator 314 is configured to receive the voltage $V_{PAD}$ of the input pad 306 and the comparator 314 compares the voltage of the input pad 306 to a reference voltage $V_{REF}$. When the voltage $V_{PAD}$ is greater than the reference voltage $V_{REF}$, the comparator 314 toggles the switch 316 from the first position to the second position, so as to couple the second voltage source to the capacitor bias resistance Rbias.

In one embodiment, a reference voltage source 318 is used to generate the reference voltage $V_{REF}$. In one embodiment, the reference voltage $V_{REF}$ is set to a value when the difference between voltage $V_{PAD}$ and Vg is below the overstress voltage for the MOS inversion capacitor. For example, in one example, the reference voltage $V_{REF}$ is set to about 1.3 Volts. So, when the voltage $V_{PAD}$ is below the reference voltage $V_{REF}$, the switch 316 will be configured to be in the first position, so as to couple the capacitor bias resistance Rbias to the output of the capacitor bias voltage generator 310. The MOS inversion capacitors CinA and CinB will be biased so as to operate in their high efficiency range, as previously described.

When the voltage $V_{PAD}$ is at or above the reference voltage $V_{REF}$, the switch 316 will toggle and switch to the second position, so as to couple the capacitor bias resistance Rbias to the second voltage source 320, which in this specific example, is ground potential. So, the capacitor bias voltage Vg will be about 0 volts. Even if the voltage $V_{PAD}$ were to swing to the maximum voltage of VP33 (in this case 3.3 Volts), the MOS inversion capacitor CinA will only be subjected to VP33−0=VP33 Volts, in this case, 3.3 Volts. This is below the maximum rated voltage of 3.6 volts for the MOS devices.

Under these conditions, the MOS inversion capacitor is biased in a range above the lower bias voltage $V_L$ and below the higher bias voltage $V_H$. Although this is not a preferred bias range for higher efficiency, as the system is operating in a range beyond the specified range for the sensor bias voltage (−1 Volt to +1 Volt), such an operating condition for the MOS inversion capacitors may not have any impact to the normal operation of the system 300.

Figure 3B:
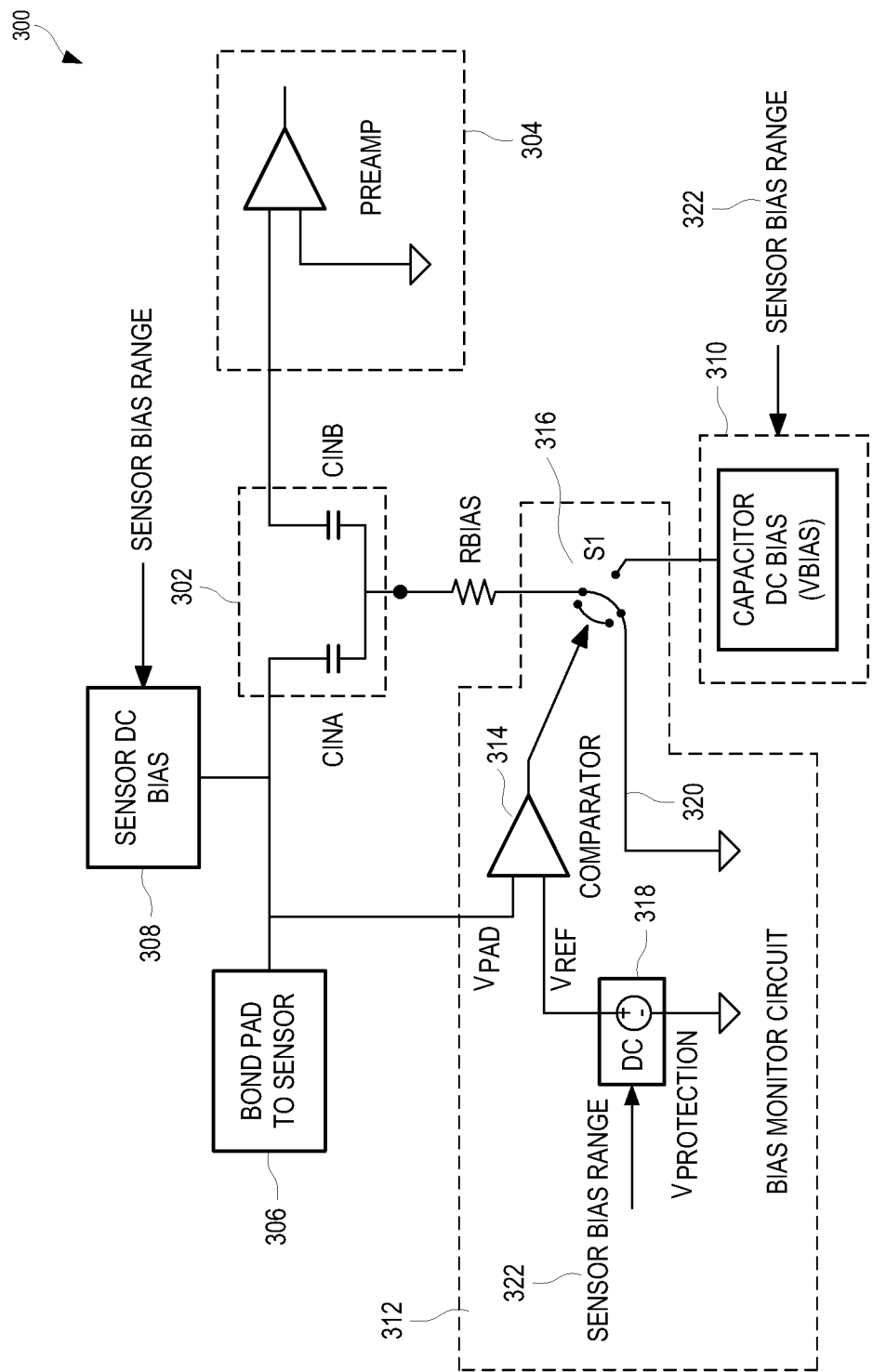
FIG. 3B illustrates another exemplary input capacitor protection circuit for the MOS inversion capacitors of FIG. 3, according to one embodiment.

FIG. 3B illustrates another exemplary input capacitor protection circuit for the MOS inversion capacitors of FIG. 3 according to another embodiment. The system 300 of FIG. 3B uses a programmable reference voltage source than that described with reference to FIG. 3A.

More specifically, the system 300 further includes a bias monitoring circuit 312. The bias monitoring circuit 312 further includes a voltage comparator 314 and a switch 316. The switch 316 is configured to toggle between a first position and a second position. In the first position, the switch 316 couples the capacitor bias resistance Rbias to the output of the capacitor bias voltage generator 310. In the second position, the switch 316 couples the capacitor bias resistance Rbias to a second voltage source 320. In this specific embodiment, the second voltage source 320 is a ground potential.

In one embodiment, a reference voltage source 318 is used to generate the reference voltage $V_{REF}$. The reference voltage source 318 is configured to selectively set the reference voltage $V_{REF}$ based on a sensor bias range 322 signal. For example, the reference voltage $V_{REF}$ is set based on the expected sensor bias voltage range. As an example, if the sensor bias voltage range is between −1 Volt to 0 Volts, the reference voltage $V_{REF}$ is set to +1.35 Volts.

In one embodiment, the sensor bias range 322 signal may be used by the capacitor bias generator 310 to generate different values of capacitor bias voltage Vg. As an example, when the reference voltage $V_{REF}$ is set to −1.35 Volts, the capacitor bias generator sets the capacitor bias voltage Vg to −2.25 Volts.

Similarly, if the sensor bias voltage range is between +1 volt and 0 Volts, the reference voltage $V_{REF}$ is set to +2.1 Volts. For this bias condition, the capacitor bias voltage Vg is set to −1.5 Volts. For example, the sensor bias range 322 signal may be used by the capacitor bias generator 310 to set the capacitor bias voltage Vg to −1.5 Volts. Under these circumstances, the capacitor bias voltage Vg of −1.5 Volts permits the Voltage $V_{PAD}$ to swing as high as +2.1 Volts, yet keeping the maximum voltage across the MOS inversion capacitor to be about +3.6 Volts.

In various embodiments, the systems and devices described in FIGS. 1-3B may help to construct MOS inversion capacitor devices for use in MOS devices that are subjected to a voltage range well within the maximum rated voltage for these devices. As an example, in a 0.25 um CMOS technology, the devices are typically rated for voltages less than 3.6 volts across the CMOS devices. A capacitor protection circuit as described herein above may be constructed for use in such application so as to protect the MOS inversion capacitors to operate within the rated maximum voltage.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A circuit comprising:
   a sensor pad;
   a sensor bias voltage circuit connected to apply a sensor DC bias voltage to the sensor pad;
   input circuitry;
   a DC-blocking capacitor bank comprising a plurality of DC-blocking capacitors connected in series, wherein the DC-blocking capacitor bank is connected in series between the sensor pad and the input circuitry to block the sensor DC bias voltage from the input circuitry;
   a capacitor bias voltage source connected to apply a capacitor bias voltage to the DC-blocking capacitors in the DC-blocking capacitor bank; and
   a bias monitoring circuit configured to monitor a pad voltage of the sensor pad and control application of the capacitor bias voltage to the DC-blocking capacitors based on the pad voltage of the sensor pad.

2. The circuit of claim 1, wherein the capacitors are MOS inversion capacitors.

3. The circuit of claim 1, further comprising a bias resistor connected between the capacitor bias voltage source and the DC-blocking capacitor bank.

4. The circuit of claim 1, wherein the input circuitry comprises a preamplifier.

5. The circuit of claim 1, wherein:
   the DC-blocking capacitor bank consists of two DC-blocking capacitors connected in series at a common node; and
   the capacitor bias voltage is applied to the common node.

6. The circuit of claim 1, wherein the bias monitoring circuit comprises:
   a switch connected between the capacitor bias voltage source and the DC-blocking capacitors; and
   a comparator configured to compare the pad voltage to a reference voltage to control the switch.

7. The circuit of claim 6, wherein the bias monitoring circuit further comprises a reference voltage source configured to generate the reference voltage.

8. The circuit of claim 7, wherein the reference voltage source is a programmable reference voltage source.

9. The circuit of claim 6, wherein the switch is configured to selectively connect the DC-blocking capacitors either (i) to the capacitor bias voltage source or (ii) to a second voltage source.

10. The circuit of claim 9, wherein the second voltage source is ground potential.

11. The circuit of claim 1, wherein:
    each DC-blocking capacitor has a low-efficiency operating range, a first high-efficiency operating range having bias voltages below bias voltages of the low-efficiency operating range, and a second high-efficiency operating range having bias voltages above the bias voltages of the low-efficiency operating range.

12. The circuit of claim 1, wherein:
    each DC-blocking capacitor is an MOS inversion capacitor having at least one high-efficiency operating range and at least one low-efficiency operating range;
    the circuit further comprises a bias resistor connected between the capacitor bias voltage source and the DC-blocking capacitor bank; and
    the bias monitoring circuit comprises:
      a switch connected between the capacitor bias voltage source and the DC-blocking capacitors;
      a comparator configured to compare the pad voltage to a reference voltage to control the switch, wherein the switch is configured to selectively connect the DC-blocking capacitors either (i) to the capacitor bias voltage source or (ii) to a second voltage source; and
      a reference voltage source configured to generate the reference voltage.

13. The circuit of claim 12, wherein the reference voltage source is a programmable reference voltage source.

14. The circuit of claim 12, wherein the second voltage source is ground potential.

15. The circuit of claim 12, wherein:
    the DC-blocking capacitor bank consists of two DC-blocking capacitors connected in series at a common node; and
    the capacitor bias voltage is applied to the common node.

16. The circuit of claim 12, wherein:
    each DC-blocking capacitor has a low-efficiency operating range, a first high-efficiency operating range having bias voltages below bias voltages of the low-efficiency operating range, and a second high-efficiency operating range having bias voltages above the bias voltages of the low-efficiency operating range.

* * * * *